United States Patent [19]

Whyland

[11] Patent Number: 5,077,702

[45] Date of Patent: Dec. 31, 1991

[54] DOPPLER CONSISTENT HYPERBOLIC FREQUENCY MODULATION

[75] Inventor: William P. Whyland, Marcellus, N.Y.

[73] Assignee: General Electric Company, Syracuse, N.Y.

[21] Appl. No.: 615,435

[22] Filed: Nov. 16, 1990

[51] Int. Cl.$^5$ .................................................. G01S 15/00
[52] U.S. Cl. .................................... 367/100; 367/101; 367/904
[58] Field of Search .............. 367/100, 101, 102, 904; 342/122, 129, 130, 145, 189

[56] References Cited

U.S. PATENT DOCUMENTS

4,831,602  5/1989  Kroenert et al. .................... 367/100

Primary Examiner—Daniel T. Pihulic
Attorney, Agent, or Firm—Paul Checkovich; Richard V. Lang

[57] ABSTRACT

Doppler insensitive waveforms, such as portions of hyperbolas having the same asymptotes, may be used to modulate pulses or sub-pulses of energy for probing a determined environment so that when the modulated energy is transmitted and received, the received energy may be processed, such as by correlation with the transmitted energy without regard to any Doppler frequency shift between the transmitted energy and the received energy. The Doppler frequency shift may have been imparted by reflection of the transmitted energy from an object having a relative radial velocity with respect to a sensor of the received energy. Also included are apparatus for processing received energy by correlation with transmitted energy, a method for modulating energy that may be transmitted and a method for detecting an object without regard to Doppler frequency shift or relative radial velocity.

18 Claims, 6 Drawing Sheets

DOPPLER CONSISTENT HYPERBOLIC FREQUENCY MODULATION

BACKGROUND OF THE INVENTION

The present invention relates to modulating electromagnetic or acoustic energy, and, more specifically, to modulating such energy so that when the modulated energy is transmitted and a portion thereof is reflected from an object and received at a processing station, the received energy may be processed by a simple signal processor, without regard for relative radial velocity between the object and a sensor or detector of the received energy.

When transmitting energy, such as for example in electromagnetic form in air and acoustic, e.g., sub-sonic, sonic or supersonic, form in water, as may be exemplified by radar and active sonar systems, respectively, it may be necessary or desirable to modulate the transmitted energy, or carrier wave, with a modulating wave having a predetermined frequency characteristic. Such modulation may be used, for example, in cases where it is desired to inject a predetermined amount of energy into a transmitting medium during a predetermined interval or pulse. The transmitting medium may not be able to support a continuous stream of energy having the same frequency characteristics over the entire interval without smearing, or otherwise undesirably distorting, the transmitted wave. Such smearing or distortion will adversely affect or degrade overall operation of a detector system, such as radar or sonar which typically includes an antenna or hydrophone, respectively, by reducing resolution and/or decreasing the signal-to-noise ratio of the system because the smearing or distortion will also be present in any received wave.

In order to combat such degradation, while still maintaining the capability for injecting relatively large amounts of energy into the transmitting medium during relatively long intervals, it is known to be beneficial to divide the total desired transmitted energy pulse into a plurality of contiguous time intervals, with each interval modulated by a different modulating signal or waveform. It is also known that it is beneficial to frequency modulate (FM) a relatively long pulse and correlate a received or reflected pulse with the modulated transmitted pulse for improving detection and range resolution of a system.

Prior approaches for combining hyperbolic frequency modulated waveforms for accurately determining range to an object or target have utilized hyperbolic waveform sections which had matching or equal time duration and varying start and end frequencies. These techniques require rather complex circuitry, especially with respect to delay circuitry, for combining matched filter outputs, or correlation results, from moving targets.

Figure 1A:
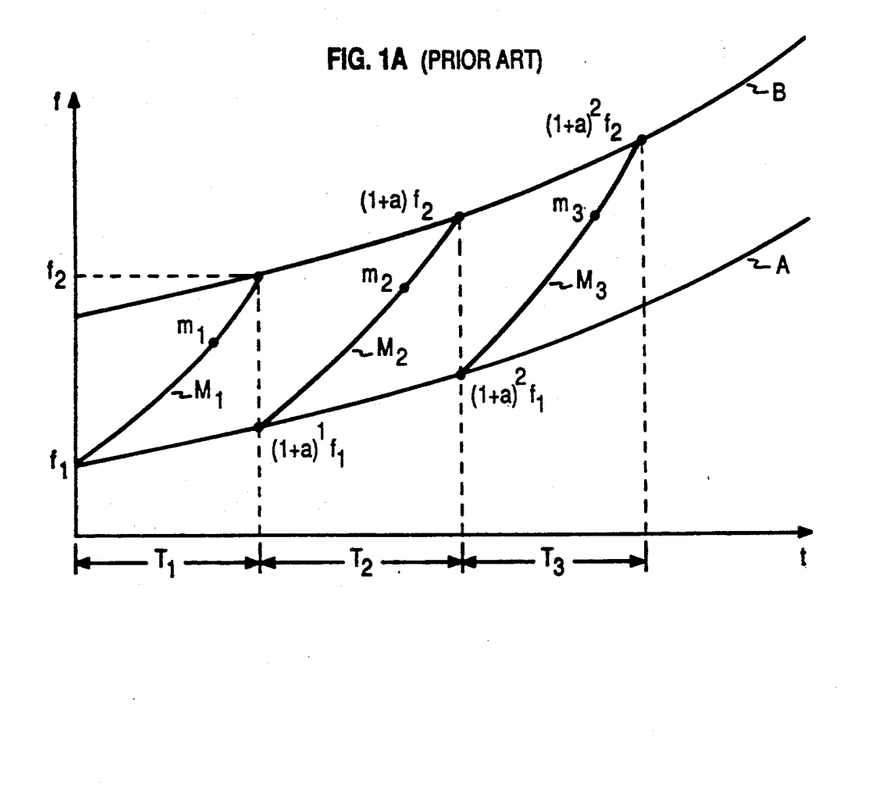
FIG. 1A is a graphic representation of a known modulating wavetrain.
Figure 1B:
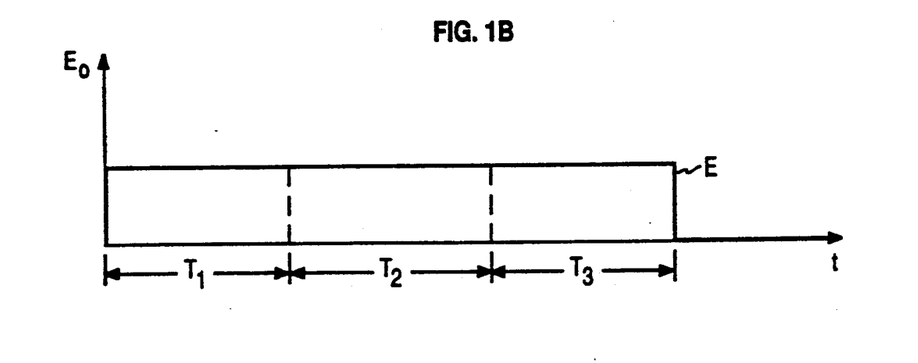
FIG. 1B is a graphic representation of a pulse of energy which may be modulated by the wavetrain of FIG. 1A.

A prior method for modulating a carrier wave is illustrated in FIG. 1A. The modulating waveform is upwardly swept, or increases in frequency, between starting and ending frequencies lying on curves A and B, respectively, during each portion, or sub-interval, $T_1$, $T_2$, $T_3$, etc. of the overall energy pulse E, as shown in FIG. 1B, for producing a wavetrain including waveforms $M_1$, $M_2$ and $M_3$. The modulating wavetrain may be repeated for a next energy pulse.

The starting frequency $f_1$ of the first segment $M_1$ of the modulating waveform is selected to be within the bandwidth of a receiver and the modulating waveform is swept to frequency $f_2$ which is also within the bandwidth of the receiver. At the end of first sub-interval $T_1$, a next modulating waveform is selected to begin at a frequency that is a multiple $(1+a)$ (wherein a is greater than zero) times frequency $f_1$ and end at a frequency that is the same multiple $(1+a)$ times frequency $f_2$. Likewise, at the end of second sub-interval $T_2$, another modulating waveform is selected to begin at a frequency that is a multiple $(1+a)$ times the starting frequency of the previous modulating waveform and end at a frequency that is the same multiple $(1+a)$ times the ending frequency of the previous modulating waveform. Thus, the starting and ending frequencies of the modulating waveforms as illustrated in FIG. 1A form a geometric progression with the ratio between corresponding successive elements being multiple $(1+a)$.

Frequency values $f_1$, $(1+a)f_1$, $(1+a)^2 f_1$ lie on curve A which is a segment of an exponential. Likewise frequency values $f_2$, $(1+a)f_2$ and $(1+a)^2 f_2$ lie on curve B which is a segment of another exponential. Further, the actual modulating frequencies for the corresponding sub-intervals of energy between each of curves A and B along curves $M_1$, $M_2$ and $M_3$ are selected to lie on curves $M_1$, $M_2$ and $M_3$ which are hyperbolic.

A radial component of relative velocity between a receiver and an object manifests itself as a time compression or frequency shift, generally referred to as a Doppler frequency shift or more simply a Doppler shift, of a transmitted wave that is reflected from the object and detected or sensed at the receiver. By radial component of relative velocity is meant the component of relative velocity that exists between one object (such as a detector or receiver) and another object (such as a target of interest) along a straight line between the one and another object. For example, if a transmitted wave is modulated in accordance with the modulating pattern or wavetrain shown in FIG. 1A, and there exists a radial component of relative velocity between a detector and an object impinged by the transmitted wave such that there is a closing or decreasing range, then the frequency modulation from reflections of the transmitted wave by the object will be detected at an apparent frequency higher than that actually transmitted. The detected shift in frequency from that actually transmitted will be a percentage of the transmitted frequency proportional to the magnitude of the radial component of relative velocity between the object and the receiver, so that higher modulating frequencies will be shifted more than lower modulating frequencies. This apparent shift in frequency is known as a Doppler shift, with the amount of frequency shift referred to as the Doppler frequency.

In order to determine the actual position or range to the reflecting object, correlation techniques are frequently employed. For basic correlation, a replica of a transmitted wave is stored at the transmitter and is compared in frequency to a received wave to obtain a maximum overlap, or correspondence, between the two. The time at which the maximum correspondence occurs with respect to the time of the initial transmitted wave is indicative of the range to the target. With knowledge of the speed of propagation of the transmitted and reflected wave in the transmitting medium, the actual range to the object can be determined.

For the modulating waveforms $M_1$, $M_2$ and $M_3$ the Doppler frequency for corresponding points $m_1$, $m_2$ $m_3$ along modulating curves $M_1$, $M_2$ and $M_3$ will different from each other when received from an object, and a customized correlation system will be required for each of modulating curves $M_1$, $M_2$ and $M_3$. For example, if points $m_1$, $m_2$ and $m_3$ each occur at a same predetermined time from the commencement of their respective modulating curve $M_1$, $M_2$ and $M_3$, then the Doppler frequency detected in response to point $m_3$ will be greater than that for point $m_2$, which in turn will be greater than that for point $m_1$, assuming that the transmitted wave impinges the same object having a closing component of radial velocity. Because of the differences in Doppler frequency among points $m_1$, $m_2$ and $m_3$ for the same target and among all other corresponding points of waves $M_1$, $M_2$ and $M_3$, the respective relative times from initial energy transmission at which correlation for waves $M_1$, $M_2$ and $M_3$ occurs will differ. If the radial distance between the object and the receiver is decreasing, the correlation time for $M_3$ will be the shortest, for $M_2$ the next shortest and for $M_1$ the longest. Thus it is not possible to ascertain at the receiver simply by noting the respective correlation times which correlation time corresponds to the true range to the object. Generally some form of hypothesis or estimation based on expected Doppler shifts is used in conjunction with the correlation times for determining the actual range.

Figure 2:
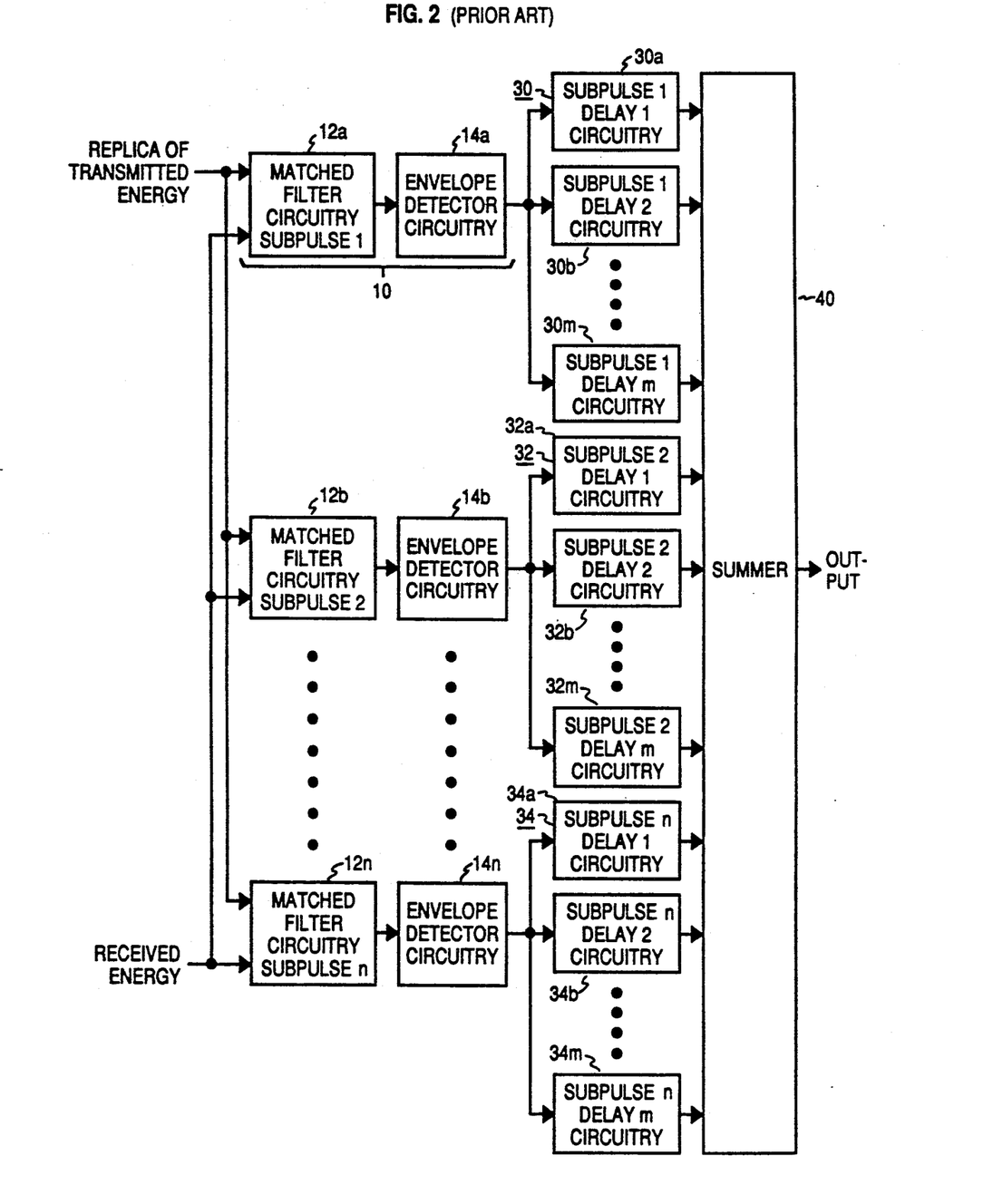
FIG. 2 is a block diagram of a known correlation system.

Referring to FIG. 2, a block diagram of a known correlation system is shown. The correlation system includes a plurality of correlation means 10, three of which are shown, each correlation means 10 including matched filter circuitry 12 and envelope detector circuitry 14, having an input connected to an output of matched filter circuitry 12, a plurality of delay means 30, 32 and 34 having an input connected to an output of corresponding envelope detector circuitry 14, and a summer 40, having a plurality of inputs connected to outputs of corresponding envelop detector circuitry 14. Matched filter circuitry 12 may all be the same, such as for example a delay line correlator or a convolution processor using fast Fourier transforms. Each of matched filter circuitry 12 is conditioned or tuned to respond efficiently to the modulating waveform of a corresponding subinterval of the modulated pulse of energy. Each of matched filter circuitry 12 has an input connected to be supplied with received energy from a detector (not shown), such as an antenna or hydrophone, wherein the received energy may be a portion of the modulated transmitted energy that has been reflected from an object of interest. Another input of each of matched filter circuitry 12 is for receiving a replica of transmitted energy for comparison with the received energy.

Envelope detectors 14 may all be the same, such as for example a full wave rectifier. Each of envelope detectors 14 is conditioned or tuned to respond efficiently to the output signal from a corresponding matched filter circuitry 12.

The output of each of envelope detectors 14, having a correlation signal available thereat, is respectively connected to the input of a corresponding plurality of delay means 30, 32 and 34. Each of delay means 30, 32 and 34 may include a plurality of delay circuitry, such as delay lines, for delaying the correlation signal received at the input a respective predetermined interval of time. Delay circuitry $30a$ through $30m$ of delay means 30 corresponds to a Doppler hypothesis, or an expected Doppler shift, due to anticipated relative velocity between the target of interest and the receiver. Each of delay circuitry $32a$ through $32m$, and $34a$ through $34m$ corresponds to the respective Doppler hypothesis of delay means 32 and 34, respectively. The value of m may be any integer greater than one. Further the amount of delay by corresponding delay circuitry, such as $30a$, $32a$ and $34a$ is generally equal. Delay means 30, 32 and 34 compensate for the differences in correlation time of the correlation signal available from each of correlation means 10, which correlation times are dependent on the frequency of the modulating waveform and the Doppler frequency of the received waveform.

The values of the delay time for each delay circuitry of delay means 30, for example, is selected by the system designer based on criteria such as the Doppler frequency shift expected to be experienced in an actual operating environment and the desired resolution of the system. This may lead to a plurality of delays and corresponding delay circuitry $30_a$–$30_m$ (wherein m is an integer greater than one) for Doppler frequency shifts corresponding to relative closing velocities of, for example, from 0 to 20 knots in two knot increments, for a total of ten different delay circuitry $30_a$a–$30_j$ for each modulating wave. If it were desired to increase the resolution to one knot increments, then the number of delay circuitry $30_a$–$30_m$ could be doubled to twenty for each modulating wave. Because of the generally large spread of possible closing velocities and typically fine velocity resolution desired, this technique may ultimately need to employ a substantial number of delay circuitry $30_a$–$30_m$. Delay circuitry $32_a$–$32_m$, and $34_a$–$34_m$ may be configured similarly.

Summer 40, which may include circuitry for adding electronic signals, adds the delayed correlation signals received from each of delay means 30, 32 and 34 for forming an output signal available at the output of summer 40. The output signal supplied by the output of summer 40 includes information in the form of signal amplitude indicative of the degree of correlation, wherein maximum amplitude represents maximum correlation, the relative time of which is indicative of the range to the object. The output signal from summer 40 may be supplied to circuitry (not shown) for additional processing as is known in the art.

Other modulation techniques, such as linear frequency modulation, wherein the modulating wave monotonically changes frequency linearly during the sub-interval, exhibit similar problems when attempting to extract range information from the reflected wave that includes a Doppler frequency shift.

Although closing ranges and approaching objects have been discussed, the invention is not limited thereto but applies equally to increasing ranges and receding objects, though generally these are of less interest.

It would be desirable to provide a system for recovering range information from a plurality of modulated sub-intervals of a pulse of energy wherein the sub-intervals may be contiguous, or from a plurality of modulated spaced apart pulses of energy, wherein, regardless of the form of the modulated energy, the amount of hardware necessary for such recovery could be reduced over that required in prior systems. Further, it would be desirable to provide a method for modulating such pulses and sub-intervals of a pulse of energy such that the results of correlation of each of the reflected modulation waveforms for each of the pulses or sub-intervals may be readily combined for recovering information, such as range to the object, independent of any relative radial velocity between the object and a detector of the reflected energy.

Accordingly, an object of the present invention is to provide apparatus and method for recovering information from a modulated pulse of energy, wherein the amount of hardware for such recovery is reduced over that required in prior systems.

Another object of the present invention is to provide a method for modulating contiguous sub-intervals of a pulse of energy and/or spaced apart pulses of energy such that the results of recovery of the received modulation for each of the sub-intervals and spaced apart pulses from reflected energy, such as from an object, may be readily combined to determine information, such as range, about the object independent of any relative radial velocity between the object and a detector of the reflected energy.

SUMMARY OF THE INVENTION

In accordance with the present invention, a correlation system for determining the amount of correlation between a predetermined first wave of energy that includes modulation by a wavetrain having a plurality of Doppler insensitive frequency waveforms, and a second wave of energy, wherein the second wave may include a portion of the first wave, and further wherein the amount of correlation may be determined without regard for any Doppler frequency shift of the second wave with respect to the first wave, comprises a plurality of channels with each channel including correlation means, such as a matched filter, for supplying a correlation signal indicative of the amount of correlation between a predetermined one of the plurality of waveforms and the second wave of energy, and delay means for delaying the correlation signal in response to the position of the one of the plurality of waveforms in the wavetrain for forming a delayed correlation signal. The correlation system further comprises combining means for combining the delayed correlation signals of each channel to form a master correlation signal that is indicative of the total amount of correlation between the first and second wave of energy. The combining may be performed by the combining means without regard to any Doppler frequency shift of the second wave with respect to the first wave due to the nature of Doppler insensitive waveforms, such as predetermined portions of a set of hyperbolas having the same assymptotes. A replica of each transmitted waveform may be stored, such as in a random access memory (RAM), by a corresponding correlation means for comparison with the second wave to determine the amount of correlation.

In another aspect of the present invention, a method for modulating a first wave of energy so that correlation of a second wave of energy with the first wave, wherein the second wave may be of such type that is reflected from an object, is independent of relative radial velocity between the object and a sensor for the second wave, comprises providing the first wave of energy and modulating the first wave with a wavetrain having a plurality of frequency waveforms with each frequency waveform being a portion of a predetermined one of a plurality of Doppler insensitive waveforms. The Doppler insensitive waveforms may include hyperbolas having the same assymptotes.

The frequency waveforms may be monotonically up-swept or down-swept and may each be swept over an entire frequency band. Further, the frequency waveforms may be selected so that at least two waveforms include a different portion from a same hyperbola and the form of energy may be acoustic or electromagnetic. The first wave may be provided during a predetermined interval with each waveform being selected for modulating a corresponding one of a plurality of sub-intervals, which may be contiguous, of the first wave. In addition, the first wave may be provided as a series of spaced apart pulses of energy with a corresponding one of the frequency waveforms for modulating each pulse of the series.

In yet another aspect of the present invention, a method for detecting an object, wherein detection is independent of relative radial velocity between the object and a sensor of energy, comprises transmitting a first wave of energy for probing a predetermined environment with the first wave including a modulation wavetrain having a plurality of frequency waveforms, each of which is a portion of one of a plurality of Doppler insensitive waveforms, sensing the environment for a second wave of energy that may include a portion of the first wave, and for each waveform correlating the second wave with a replica of the first wave for forming a correlation signal and delaying the correlation signal to form a delayed correlation signal, wherein the amount of delay is indicative of the relative position of the waveform in the wavetrain. The method further comprises combining the delayed correlation signals for forming a master correlation signal and declaring the presence of the object when the master correlation signal exceeds a predetermined threshold, wherein the master correlation signal is independent of relative radial velocity between the object and the sensor. The Doppler insensitive waveforms may include hyperbolas having the same predetermined assymptotes.

The method for detecting an object may also include transmitting the first wave during a first interval with the wavetrain beginning and ending at the beginning and ending of the first interval, respectively, and with each waveform for modulating one of a plurality of sub-intervals, which may be contiguous, of the first interval, wherein the beginning and ending of the waveform coincides with the beginning and ending, respectively, of a corresponding sub-interval of the first interval and wherein the step of delaying includes delaying the correlation signal an amount responsive to the duration of the wavetrain less the duration of a second interval that is measured from the ending of the corresponding waveform to the ending of the wavetrain.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

Figure 3A:
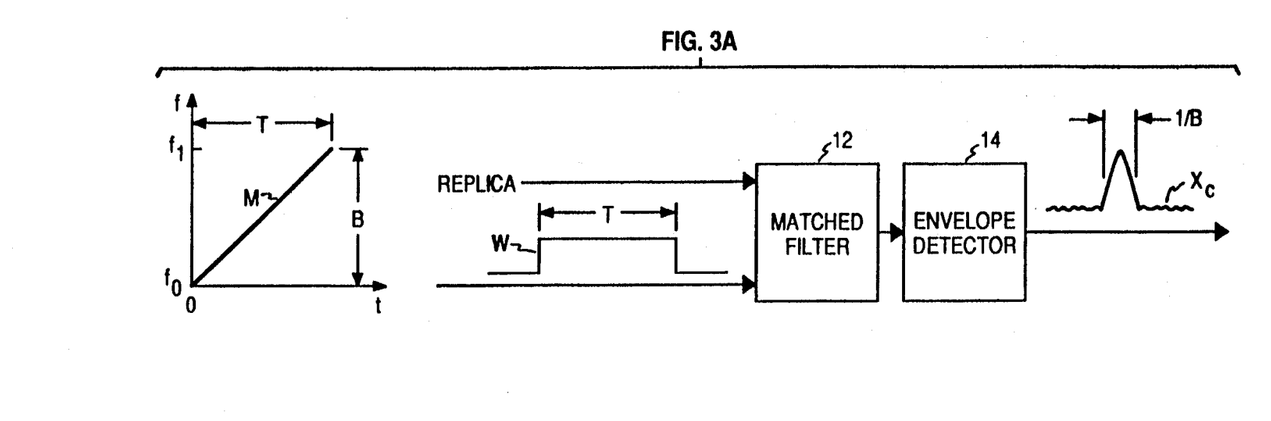
FIG. 3A is a block diagram of a portion of a single correlation channel.
Figure 3B:
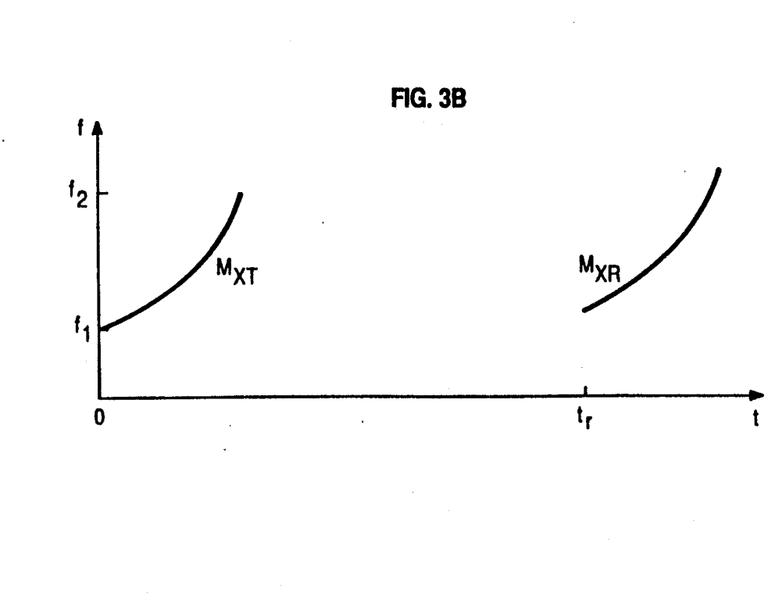
FIG. 3B is a graphic representation of a transmitted and received waveform showing the relative timing therebetween.
Figure 3C:
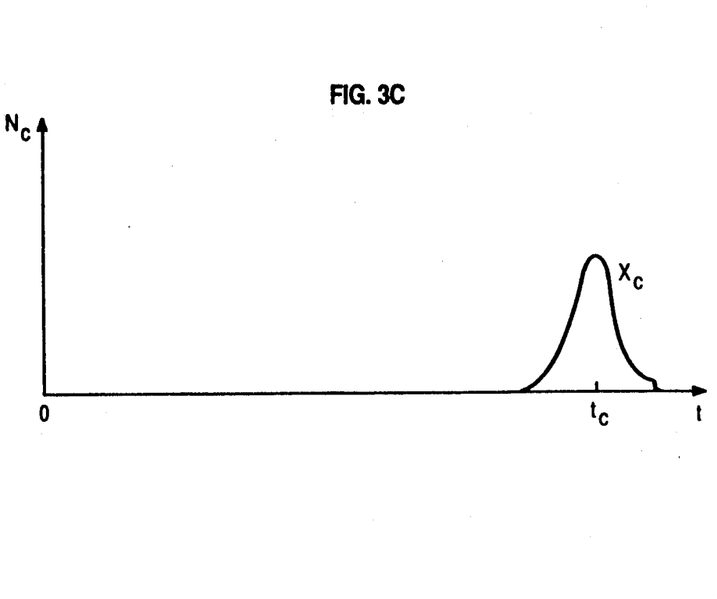
FIG. 3C is a schematic representation of the correlation signal expected from the received waveform of FIG. 3B.

Referring to FIGS. 3A–3C a modulating waveform M has a duration, or period, T and a bandwidth B, which is the absolute difference in frequency between starting frequency $f_0$ and ending frequency $f_1$. Although modulating waveform M is illustrated as a monotonically increasing hyperbolic waveform, it may also be a monotonically decreasing hyperbolic waveform.

Modulating waveform M, and/or any Doppler shifting thereof, may be beneficially recovered by use of matched filter circuitry 12 and envelope detector circuitry 14 which together may form a portion of a single channel. Matched filter circuitry 12, which may include a delay line correlator or a processor such as a general purpose computer using fast Fourier transforms, has one input for receiving an energy wave W having modulating waveform M impressed thereon. Energy wave W is typically obtained from a receiver or detector such as may be available with a radar or sonar system.

Another input of matched filter 12 receives a replica waveform, which is typically a copy of a transmitted wave of energy including modulation thereof in the case of a radar or sonar system, that is stored in matched filter 12, such as in a random access memory (RAM), and against which the waveform available at the one input of matched filter 12 will be compared. The output of matched filter 12 is connected to the input of envelope detector 14 which may include a full wave rectifier or processor such as a general purpose computer using an absolute value computation.

The output of detector 14 has available a correlation signal indicative of the degree or amount of correlation, or matching, between energy wave W and the replica signal stored in matched filter circuitry 12. A representative correlation signal $X_c$ is shown adjacent the output of detector 14. Regardless of the shape of modulating waveform M, the large peak of correlation signal $X_c$, representing maximum correlation or overlap between energy wave W and the replica signal when energy wave W includes at least a portion of the transmitted signal with modulation waveform M, has a pulse width at the 3db power points down from the peak of about the value of 1/B, where B is the bandwidth of modulating waveform M.

Referring to FIG. 3B, a representative modulating waveform $M_{XT}$ having a hyperbolic profile for modulating an energy pulse is shown. Modulating waveform $M_{Xt}$ may be impressed on a transmitted energy wave which is transmitted beginning at relative time t=0. A portion of the transmitted energy wave may be reflected from an object and received along with modulating waveform $M_{XR}$ beginning at relative time $t=t_r$. As the reflected wave with modulating waveform $M_{XR}$ impressed thereon is received, it may be supplied to the input of matched filter circuitry 12 which has been previously conditioned, as is known in the art, to expect a signal appearing within frequency band $f_2$-$f_1$, as shown in FIG. 3B. Due to Doppler effects, received modulation waveform $M_{XR}$ is shown upwardly shifted in frequency from transmitted modulation waveform $M_{Xt}$, such that a portion of received modulation waveform $M_{XR}$ lies outside the bandwidth defined by frequencies $f_1$ and $f_2$.

When reflected energy, including modulating signal $M_{XR}$, is supplied to matched filter circuitry 12, matched filter 12 begins to compare it with a replica of transmitted energy including modulating waveform $M_{XT}$. The correlation curve $X_c$ in FIG. 3C represents the relative timing and magnitude of the amount of correlation between the replica and received wave as determined by matched filter circuitry 12 in combination with envelop detector 14 when the received wave includes at least a portion of the transmitted wave. The ordinate $N_c$ of FIG. 3C represents the number of correlating, overlapping or corresponding points between the received energy wave including modulation waveform $M_{XR}$, and the replica of the corresponding transmitted energy wave including modulation waveform $M_{XT}$, which is stored in matched filter 12. At a time $t_c$ it is noted that curve $X_c$ is at a maximum, indicating that time $t_c$ is the time at which maximum correlation is detected by matched filter circuitry 12. The interval from t=0 to $t=t_c$ is indicative of the range to the object.

Figure 4:
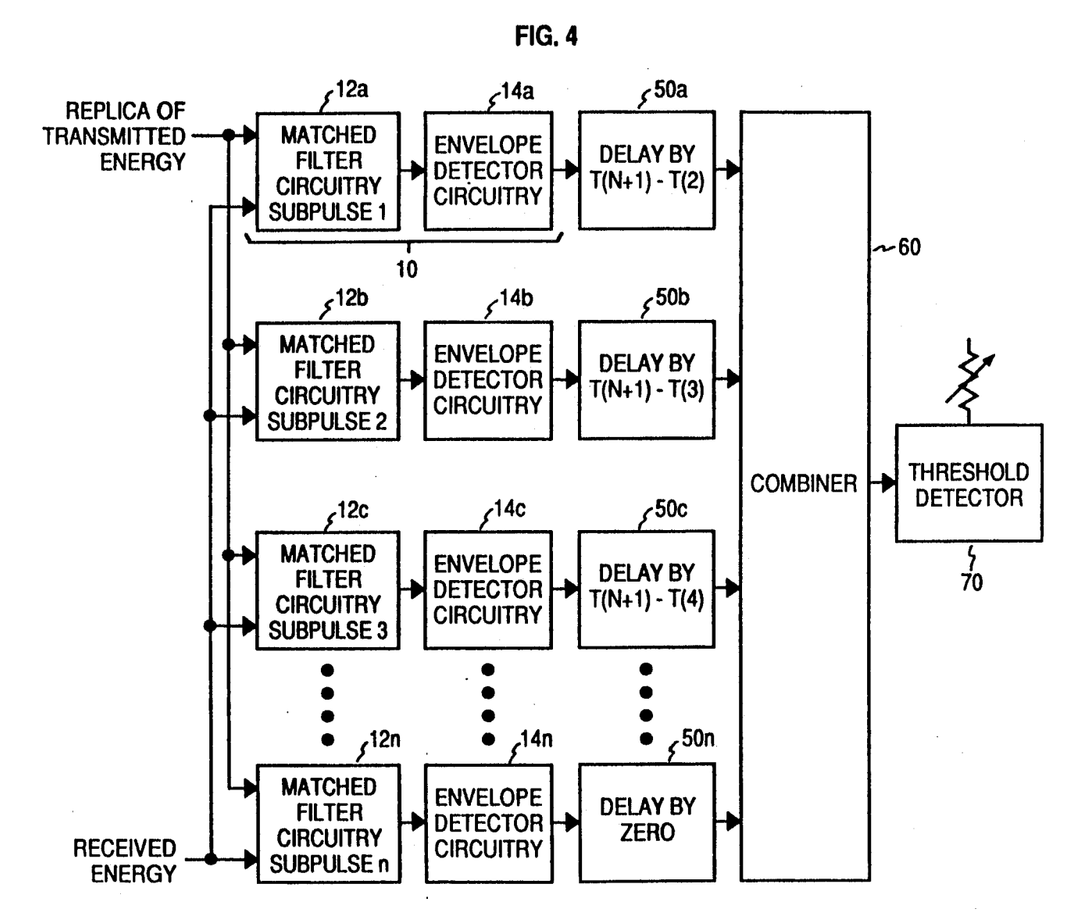
FIG. 4 is a schematic representation of a correlation system in accordance with the present invention.

Referring to FIG. 4, a detector system in accordance with the present invention is shown. Correlation means 10, for generating and supplying a correlation signal whose amplitude is indicative of the amount of correlation between two signals, include matched filter circuitry 12 and envelope detector circuitry 14, which may be the same as matched filter circuitry 12 and envelope detector 14, respectively, that are shown and described in conjunction with FIG. 2. Components of each correlation channel are indicated by a same alphabetic character.

Each of matched filter circuitry 12a through 12N, wherein N represents an integer greater than one, is selected to be responsive to a respective one of a plurality of modulating waveforms for modulating for example, a respective corresponding one of a plurality of sub-intervals, which may be contiguous, of a predetermined interval, or pulse, of energy or of a respective corresponding one of a plurality of spaced apart pulses of energy. The selection and conditioning of the electronic and frequency response characteristics for each of matched filter circuitry 12a through 12N and corresponding envelope detector 14a through 14N may be performed by one of ordinary skill in the art without undue experimentation.

Matched filter circuitry 12 includes one input, constituting one input of correlation means 10, for receiving a signal indicative of a replica of transmitted energy, including modulation thereof, and another input, constituting another input of correlation means 10, for receiving a signal indicative of the received energy, such as from a sensor or detector. The received energy may be predeterminedly pre-conditioned as is known in the art before being supplied to correlation means 10.

Envelope detector circuitry 14a through 14N each includes an input connected to an output of a corresponding matched filter circuitry 12a through 12N. The combination of each of matched filter circuitry 12a through 12N cooperates with corresponding envelope detector circuitry 14a through 14N to provide a correlation signal, such as shown and described in accordance with FIGS. 3A-3C, at the output of each of detector circuitry 14a through 14N.

Each of a plurality of delay means 50, 50a through 50N of which are shown, include an input connected to an output, which constitutes an output of correlation means 10, of respective envelope detector circuitry 14a through 14N for receiving the corresponding correlation signal. Delay means 50 may include an analog or digital delay circuit, or line, as is known in the art. Combiner means 60, such as a summer, includes a respective input connected to the output of each of a corresponding one of delay means 50 for receiving a respective delayed correlation signal. The output signal available at the output of combiner means 60 is a combination, such as a summation, of each of the delayed correlation signals that are supplied to the corresponding inputs of combiner means 60. Combiner means 60 may include circuitry for algebraically adding the signals available at the inputs of combiner means 60 for forming a master correlation signal whose amplitude is representative of the amount of correlation between the replica and the received energy.

The master correlation signal, which is available at the output of combiner means 60, may be provided to threshold detector circuitry 70, which may include an adjustable threshold detector, for determining when the amplitude of the master correlation signal exceeds a predetermined threshold. When the amplitude of the master correlation signal exceeds the threshold, the presence of a target may be declared as is known in the art.

As can be readily noticed by comparing the circuitry of FIG. 2 (prior art) with that of FIG. 4 (one embodiment of the present invention), the present invention only requires one delay means 50 per correlation channel (A correlation channel includes, for example, correlation circuitry 12a, envelope detector circuitry 14a and delay means 50a. Other channels may be constituted likewise.) Further, in order to complete the pattern, delay means 50 has been shown for each correlation channel. However, examination of delay means 50N indicates that the delay provided by delay means 50N is zero. Thus, delay means 50N is not actually required and the output of envelope detector 20N can be directly connected to a corresponding input of combiner 60. As can then be appreciated, only N−1 delay means 50 are required by the present invention, that is, one less than the total number of correlation channels, resulting in a substantial hardware saving over prior systems, such as, for example, the one shown in FIG. 2.

How correlation signals may be simply combined and how the resultant reduction in hardware is achieved in accordance with the present invention will now be explained. In short, a primary reason for such reduction and simplicity in combining relates to selection of the form of the modulating wavetrain.

Figure 5A:
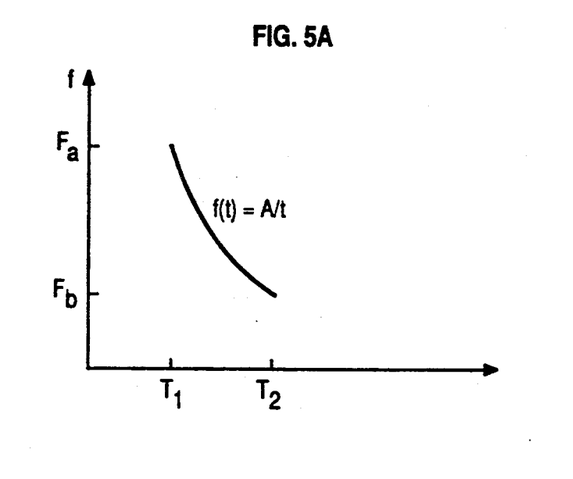
FIG. 5A is a graphic representation of a modulating waveform in accordance with the present invention.

Referring to FIG. 5A, a hyperbolic frequency modulated (HFM) waveform may be defined by the frequency trajectory $f(t) = A/t$, over a predetermined interval $T1 < t < T2$. The parameters A, T1, and T2 may be determined as a function of the waveform's start and end frequencies $F_a$ and $F_b$, respectively, and its duration T, using the following relationships:

$$A = (F_a)(F_b)(T)/(F_a - F_b), \quad (1)$$

$$T1 = A/F_a, \text{ and} \quad (2)$$

$$T2 = A/F_b, \quad (3)$$

wherein quantities within adjacent parentheses are to be multiplied.

Figure 5B:
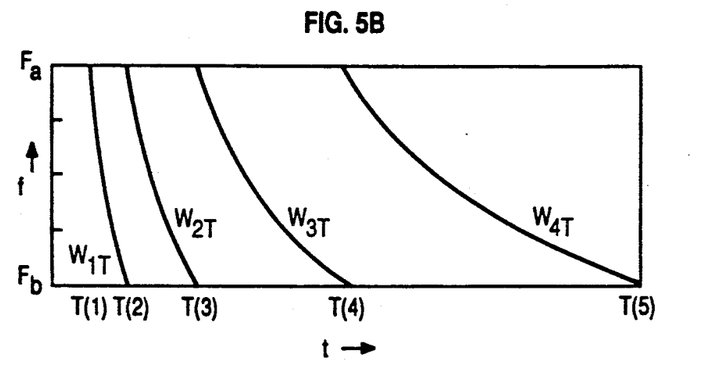
FIGS. 5B and 5C are a graphic representation of a transmitted and received wavetrain, respectively, in accordance with the present invention.

The time origin chosen for this representation is arbitrary. Its position relative to the beginning of the waveform, at time T1, is dependent upon the parameters of the waveform. In order to obtain a DCHFM (Doppler-Consistent Hyperbolic Frequency-Modulated) wavetrain in accordance with the present invention, a sequence of HFM waveforms which have the same time origin, or assymptotes, and which may be contiguous as shown, is determined. The index number of the particular waveform in a wavetrain may be denoted by k, with k running from 1 to N, and N being the total number of waveforms, which also corresponds to the number of contiguous sub-pulses, or sub-intervals, into which the pulse of energy to be transmitted is divided. The start time of the k-th waveform may be defined as T(k). The (k+1)-th waveform begins at the end of the k-th waveform. Though there are only N waveforms in the wavetrain, T(N+1) may be defined as the end of N-th waveform. The wavetrain of FIG. 5B is labeled along the time axis t in accordance with this convention. The frequency ratio r may be defined as $r = F_a/F_b$. Then from Equations (2) and (3), the following relationships may be determined:

$$T(2) = rT(1), \quad (4)$$

$$T(3) = rT(2) = r^2 T(1), \text{ or, in general,}$$

$$T(k+1) = r^k T(1).$$

The total duration D of the wavetrain is given by $$D = ABS[T(N+1) - T(1)], \text{ so that} \quad (5)$$

$$D = T(1)(r^N - 1),$$

wherein ABS[x] indicates the absolute value of the argument x. T(1) may be either positive or negative, depending on whether the wavetrain consists of up-chirps, i.e., increasing frequency, or down-chirps, i.e., decreasing frequency. However, duration D, as given by Equation (5), is positive in both cases. For a predetermined wavetrain having N waveforms, each starting at frequency $F_a$ and ending at frequency $F_b$, with total duration D, the sequence of start times T(k) may be determined by first finding T(1) using rearranged Equation (5), as $$T(1) = D/(r^N - 1), \quad (6)$$

and then finding start times T(k) for K=2 to N using Equation (4). The parameters A(k) of each waveform may be represented by $$A(k) = T(k)(F_a). \quad (7)$$

The frequency trajectory of the k-th waveform may be represented by the relationship $$f = A(k)/t \text{ for } T(k) \leq t < T(k+1), \ 1 \leq k \leq N. \quad (8)$$

When one of these waveforms is transmitted, and reflected from an object which is moving at a range rate, or relative radial velocity, v with respect to the source or a sensor or receiver, the received signal is delayed in time by an amount 2r/c seconds, and time-compressed by the time compression ratio a=(c−v)/(c+v), wherein c is the velocity of the energy waveform in the transmitting medium. The delay 2r/c is relative to the time origin that was previously selected, i.e., the time origin illustrated in FIG. 5B., and r is the exact target range at time r/c, relative to the same time origin. The transmitted waveform has a transmitted phase $P_t$ that may be expressed by the relationship $$P_t = 2\pi A(k) \log(t), $$

and that may be obtained by integrating the frequency function of equation (8). Time compression by time compression ratio a gives a received phase $P_r$ that may be represented by the expressions $$P_r = 2\pi A(k) \log(at), \text{ or} \quad (9)$$

$$P_r = 2\pi A(k)[\log(t) + \log(a)]. \quad (10)$$

Differentiating the received phase $P_r$ of equation (9) or (10) gives an expression for the received frequency $F_r$, which may be written as $$F_r = A(k)/t \text{(in Hz)}. \quad (11)$$

Figure 5C:
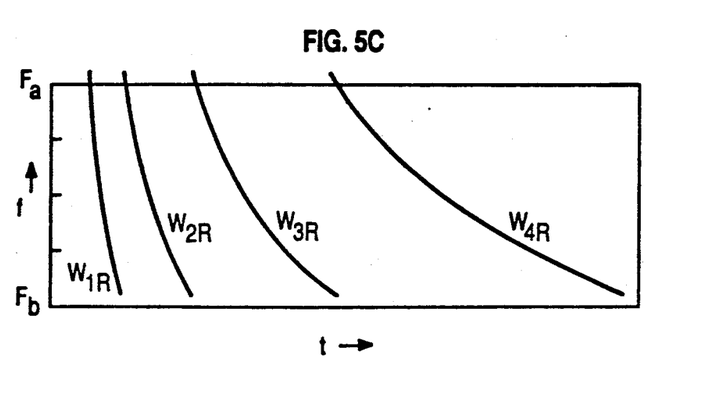

It is noted that this expression (11) is identical to one which may be used to represent the transmitted waveform, and is independent of the time compression ratio a. Though the received waveform is time compressed relative to the chosen time origin, the shift in frequency is exactly compensated for by the time compression. The only part of the frequency trajectory that doesn't match is the portion on the end of the waveform that is shifted to be outside the frequency band. In FIG. 5C, this mismatched portion is observed at the leading edge of each of received waveforms $W_{1R}-W_{1T}$ in that portion where the frequency exceeds $F_a$. For a target with increasing range rate, the mismatched portion would appear where the received frequency would fall below the lowest transmit frequency such as $F_b$ of FIG. 5B, at the trailing edge of each received waveform. Thus, hyperbolic waveforms having the same assymptotes may be considered to be Doppler insensitive when used to modulate energy and to process at least a portion of such energy, as may be reflected from a moving target, in accordance with the present invention.

A receiver for this wavetrain may be as shown in FIG. 4 and include a plurality of N correlation means 10, each being matched to one of the transmitted waveforms $W_{1T}-W_{4T}$ in the wavetrain of FIG. 5B. If each of correlation means 10 is selected to have the same initial delay, then the successive (from channel a to N) correlation signals may be delayed by corresponding delay means 50 having corresponding delay values of $T(N+1)-T(2)$, $T(N+1)-T(3)$, $T(N+1)-T(4)$, ..., $T(N+1)-T(N)$, 0, before combining, wherein $T(N+1)$ represents the total duration of the wavetrain and $T(k)$ represents the start time of the k-th waveform as previously defined.

The correlation peaks (FIG. 3C) available at the outputs of delay means 50 (FIG. 4), will be simultaneous in time, regardless of the object-to-sensor range rate. Appropriate amplitude weighting may be provided in each channel, such as in delay means 50 or combiner means 60, to compensate for differing energy levels in individual waveforms.

Referring to FIG. 5B, an example of a frequency trajectory of a Doppler Consistent Hyperbolic Frequency Modulated waveform in accordance with the present invention is shown. The waveform includes hyperbolic waveform segments $W_{1T}$, $W_{2T}$, $W_{3T}$ and $W_{4T}$ from four respective hyperbolas, wherein the subscript T indicates a transmitted waveform, and further wherein the four hyperbolas all have the same assymptotes.

The hyperbolas of which waveforms $W_{1T}-W_{4T}$ are a respective part may be of the form $f(t)=A/t$ as shown in FIG. 5A, wherein A is a predetermined constant, t is the time along one axis, such as the abscissa, and f(t) is the value of the frequency along another axis, such as the ordinate, that is orthogonal to the one axis. The value of A is different for each of the hyperbolas of which waveform $W_{1T}-W_{4T}$ form a part. A family of hyperbolas may be generated by selecting a value for A and varying t over a predetermined range to determine a set of frequencies f, and then selecting another value of A and varying t over the same or a different range to determine another set of frequencies f.

Each of waveforms $W_{1T}-W_{4T}$ sweeps from an upper frequency $F_a$ to a lower frequency $F_b$, the respective upper and lower frequencies of the maximum passband for correlation means 10a through 10N, whose difference determines the bandwidth of the system. Waveform $W_{1T}-W_{4T}$ have varying durations, with $W_{1T}$, the earliest in time being the shortest, and $W_{4T}$, the latest in time being the longest.

Referring to FIG. 5C, frequency trajectories $W_{1R}-W_{4R}$ of a pulse of energy that is modulated by the wavetrain of FIG. 5B, and such as may be reflected by and received from an object with a closing radial component of relative velocity of about two percent of the velocity of propagation of the transmitting medium for the energy, are shown on a relative time and frequency scale. The frequency trajectories $W_{1R}-W_{1T}$ of FIG. 5C would actually be detected at some time later than those of FIG. 5B based on the range to the object.

By comparing the frequency trajectories of FIGS. 5B and 5C, it is noted that the received wavetrain of FIG. 5C occupies a shorter time interval than the transmitted wavetrain of FIG. 5B, and that the frequencies of FIG. 5C are higher for corresponding points along each frequency trajectory. However, by superimposing the trajectories of FIG. 5C on those of FIG. 5B, it is further noted that the portions of the received waveforms of FIG. 5C remaining within the original transmitted frequency band as bounded by frequencies $F_a$ and $F_b$ have identical frequency trajectories to corresponding transmitted waveforms.

Hence, the received waveform may be processed by a plurality of correlation means 10a–10N (FIG. 4), wherein a corresponding one of correlation means 10a–10N is matched or tuned to receive a respective one of the sub-pulse modulation waveforms of the transmitted energy. Because of the above-noted spectral overlap correspondence between transmitted and received modulation waveforms when a pulse of energy is modulated in accordance with the present invention, the time of the correlation peak as detected by each channel will be unaffected by receiver sensor-to-object motion. Only a small envelope loss that is associated with the slight loss of spectral overlap due to a portion of received waveform lying outside the original transmitted band of modulation frequencies will be experienced. It would be apparent to one of ordinary skill in the art that for a receding object the detected frequency would be lower than that transmitted and a portion of the received wavetrain would extend lower than $F_b$.

Figure 5D:
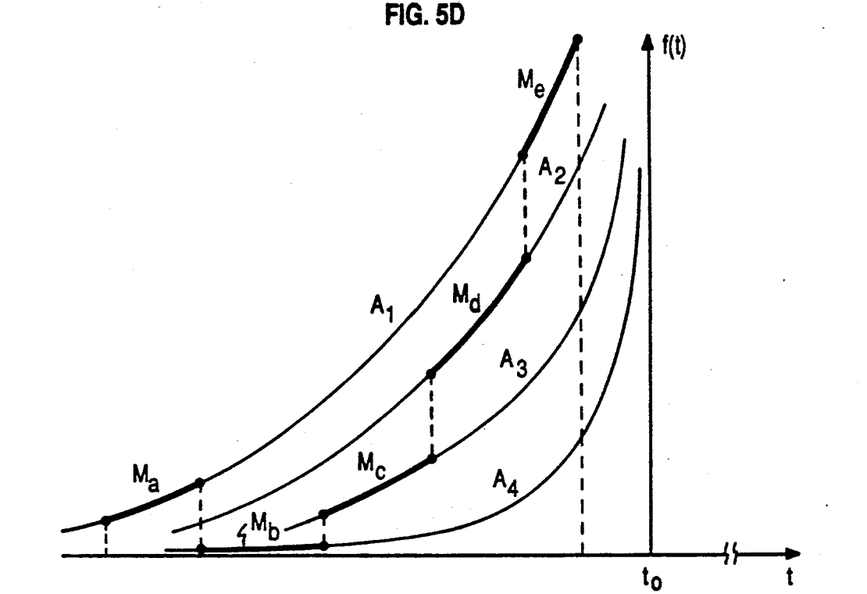
FIG. 5D is a graphic representation of a plurality of modulating waveforms in accordance with the present invention.

Referring to FIG. 5D, a graphic representation of a plurality of modulating waveforms in accordance with the present invention is shown. The composite wavetrain would sequentially include modulating waveforms $M_a$ through $M_e$ which are segments of hyperbolas of the form $f(t) = A_n/(|t| - t_0)$, wherein $|t|$ represents the absolute value of t and $A_n$ is a constant that varies from $A_1$ to $A_4$ as shown. This ensures that hyperbolas $A_1-A_4$ have the same assymptotes. It is noted that modulation waveforms $M_a$ and $M_e$ are different sections of the same hyperbola. Further, because the value of A is not limited except as may be necessary for a practical or desired implementation scheme, an infinite number of hyperbolas will satisfy the criteria of the present invention. Additionally, waveforms $M_a$ through $M_e$ of the composite wavetrain each have a respective predetermined position within the wavetrain.

It is noted that it is not necessary that each of modulation waveforms $M_a-M_e$ sweep over the entire frequency band, which would extend from the frequency value at the leading edge of waveform $M_b$ to the frequency value at the trailing edge of waveform $M_e$, in order to achieve benefits of the present invention. Also, the duration of the sub-intervals may be equal, the sub-intervals need not be contiguous, and, in fact, there may be no sub-intervals at all for achieving benefits of the present invention.

Figure 5E:
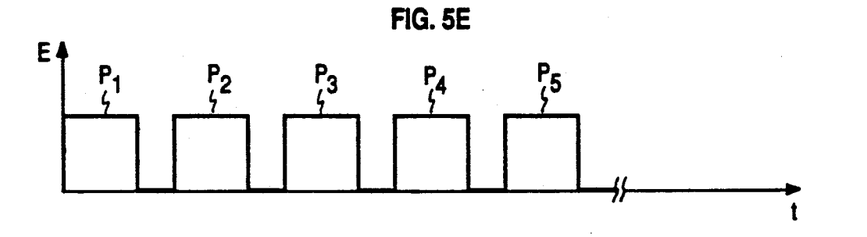
FIGS. 5E and 5F are a graphic representation of a plurality of energy pulses and a wavetrain including waveforms for modulating the pulses of FIG. 5E, respectively.
Figure 5F:
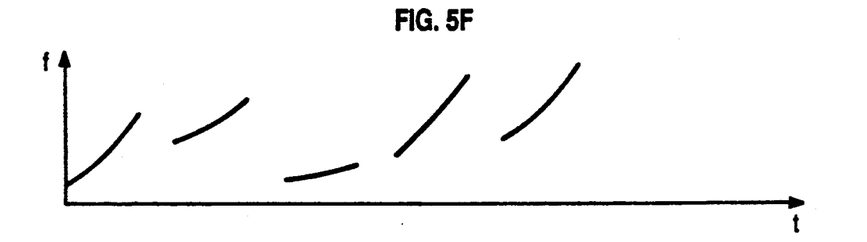

Referring to FIGS. 5E and 5F, a graphic representation of a plurality of energy pulses and a wavetrain including waveforms for modulating the pulses of FIG. 5E, respectively, are shown.

Five pulses $P_1-P_5$ are illustrated. Each pulse includes a live, or active, time interval p during which energy is present, followed by a dead time interval q during which energy is not present. This pattern, or a similar one, may be used, for example, in systems wherein a transmitter is unable to transmit energy continuously over an extended period of time due to excessive heat build-up or other considerations. The dead time q provides a cooling or rest period. The ratio between the active time interval and the dead time interval, or duty cycle, is not critical. Although pulses $P_1-P_5$, and also corresponding live times p and dead times q, are shown having equal duration, it is not necessary that this be so.

FIG. 5F indicates one set of waveforms which may be used to modulate the energy pulses of FIG. 5E in accordance with the present invention. The modulating waveforms of FIG. 5F are all representative of frequency trajectories of portions of hyperbolas having the same assymptotes. It is noted that each waveform modulates the entire live time p of an energy pulse, that is, there are no sub-pulses or sub-intervals, and further, the active portions p of the pulses are not contiguous.

The waveforms of FIGS. 5B, 5C, 5D and 5F are presented by way of example only and are not to be taken as limiting. Other modulation schemes are possible in accordance with the present invention. For example, the wavetrain may include a plurality of up-sweeps in frequency (start low-end high) and can include any number of modulating waveforms of any desired total duration that may occupy any desired frequency band, provided that the modulating waveforms are selected from segments of Doppler insensitive frequency waveforms, such as hyperbolas having the same assymptotes, as described herein.

It is further noted that one benefit of the present invention is that the DCHFM signals may all occupy the same frequency band and each modulating waveform for a corresponding entire pulse of energy, or for a corresponding sub-pulse of a pulse of energy, may be swept over the entire frequency band. This is beneficial because it represents efficient use of available bandwidth.

It is well known to one of ordinary skill in the art how to generate a modulating wavetrain having individual waveforms which follow desired frequency trajectories, including hyperbolic ones, by using analog or digital techniques or a combination thereof.

Figure 6:
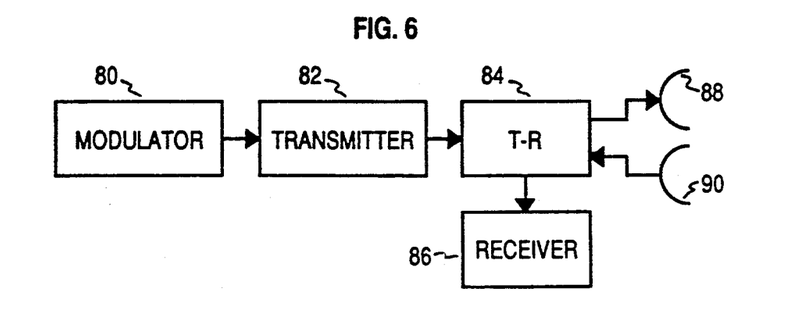
FIG. 6 is a block diagram of a system which may beneficially employ the present invention.

One application for energy waveforms that are modulated in accordance with the present invention is a target detection system, such as radar or sonar. Referring to FIG. 6, a simplified block diagram of such a system is shown.

The target detection system includes a transmitter 82 for generating waves of energy, a transmit-receive switch 84, having an input connected to the output of transmitter 82 for receiving the generated waves of energy, radiating means 88, having an input connected to an output of transmit-receive switch 84 for receiving the generated waves of energy, and a modulator 80 for supplying wavetrains including modulating waveforms to transmitter 82. Radiating means 88 injects the waves of energy into the transmitting medium, such as air or water. For a sonar system radiating means 88 may include a transducer and for radar an antenna.

The target detection system further includes receiving means 90, such as a hydrophone for sonar and an antenna for radar, having an output connected to an input of transmit-receive switch 84, and a receiver 86, having an input connected to another output of transmit-receive switch 84. Transmit-receive switch 84 blocks the typically high power energy signals available from the output of transmitter 82 from entering receiver 86 during transmission, while permitting received energy from receiving means 90 to enter receiver 86 during all other times. In the case of radar and sonar, radiating means 88 and receiving means 90 may constitute the same component, such as an antenna and transducer, respectively.

In operation, modulator 80 supplies wavetrains including modulating waveforms to transmitter 82. Transmitter 82 modulates waves of energy in response to the supplied wavetrain and directs the modulated waves of energy to radiating means 88. Radiating means 88 transmits or injects the modulated energy into the transmitting medium for probing a predetermined environment. Receiving means 90 senses the predetermined environment and supplies any energy detected to receiver 86. Typically the energy detected by receiving means 90 will include portions of the transmitted energy that are reflected from objects, some of which may be targets of interest. The circuitry of FIG. 4 may be part of receiver 86, and the energy received by receiving means 90 may be provided to correlation means 10 (FIG. 1) for processing as previously described.

Of course timing and synchronization must be provided among the components shown in FIG. 6 as is known in the art. Further, one of ordinary skill in the art will recognize that the diagram of FIG. 6 is rather simple for highlighting the principle elements involved, it being understood that conventional target detection systems may be significantly more complex. However, the principles of the present invention are applicable regardless of the complexity of the systems with which they are to be used.

Thus has been illustrated and described apparatus and method for recovering information from a modulated pulse of energy, wherein the amount of hardware for such recovery is reduced over that required in prior systems. Also, illustrated and described is a method for modulating sub-intervals of a pulse of energy such that the results of recovery of received modulation for each of the sub-intervals from a reflected pulse of energy, such as from an object, may be readily combined to determine information, such as range, about the object independent of any relative radial velocity between the object and a detector of the reflected energy. In addition, apparatus and method for detecting an object, wherein detection is independent of relative radial velocity between the object and a sensor of energy have been shown and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A correlation system for determining the amount of correlation between a predetermined first wave of energy including modulation by a wavetrain, the wavetrain including a plurality of Doppler insensitive frequency waveforms, each waveform having a respective predetermined position within the wavetrain, and a second wave of energy, wherein the second wave may include a portion of the first wave, without regard for any Doppler frequency shift of the second wave with respect to the first wave, comprising:

a plurality of channels, each channel including:
correlation means having an input for receiving a signal indicative of the second wave of energy, the correlation means conditioned for processing a predetermined one of the plurality of waveforms and for supplying a correlation signal indicative of the amount of correlation between the one of the plurality of waveforms and the second wave of energy;
delay means having an input coupled to an output of the correlation means for receiving the correlation signal, the delay means for delaying the correlation signal in response to the position of the one of the plurality of waveforms in the wavetrain for forming a delayed correlation signal; and
combining means having an input coupled to an output of the delay means for receiving the delayed correlation signal, the combining means for combining the delayed correlation signals received from the delay means of each channel to form a master correlation signal indicative of the total amount of correlation between the first and second wave of energy, wherein the combining may be performed without regard to any Doppler frequency shift of the second wave with respect to the first wave.

2. The system as in claim 1, wherein the correlation means includes:
matched filter circuitry having an input for receiving the signal indicative of the second wave of energy and an output, the matched filter circuitry for generating a raw correlation signal; and
envelope detector means having an input connected to the output of the matched filter circuitry, the envelope detector means for supplying the correlation signal in response to the raw correlation signal.

3. A method for modulating a first wave of energy so that correlation of a second wave of energy with the first wave, the second wave such as may be reflected from an object, is independent of relative radial velocity between the object and a sensor for the second wave, comprising:
providing the first wave of energy;
modulating the first wave with a wavetrain having a plurality of frequency waveforms, each frequency waveform being a portion of a predetermined one of a plurality of Doppler insensitive waveforms.

4. The method as in claim 3, wherein the Doppler insensitive waveforms include hyperbolas having the same assymptotes.

5. The method as in claim 4, wherein the step of modulating includes sweeping the waveforms over an entire predetermined frequency band.

6. The method as in claim 4, wherein the step of modulating includes sweeping monotonically from a predetermined starting frequency to a predetermined ending frequency, wherein the ending frequency is greater than the starting frequency.

7. The method as in claim 4, wherein the step of modulating includes sweeping monotonically from a predetermined starting frequency, wherein the ending frequency is less than the starting frequency.

8. The method as in claim 4, wherein at least two waveforms include a different portion from a same hyperbola.

9. The method as in claim 4, wherein the wave of energy includes acoustic energy.

10. The method as in claim 4, wherein the wave of energy includes electromagnetic energy.

11. The method as in claim 4, wherein the step of providing includes providing the first wave during a predetermined interval and each waveform for modulating a corresponding one of a plurality of sub-intervals of the first wave.

12. The method as in claim 11, wherein the sub-intervals are contiguous.

13. The method as in claim 4, wherein the step of providing includes providing the first wave as a series of spaced apart pulses of energy and further wherein the step of modulating includes modulating the spaced apart energy pulses with a corresponding one of the waveforms.

14. A method for detecting an object, wherein detection is independent of relative radial velocity between the object and a sensor of energy, comprising;
transmitting a first wave of energy for probing a predetermined environment, the first wave including a modulation wavetrain having a plurality of frequency waveforms, each frequency waveform being a portion of a predetermined one of a plurality of Doppler insensitive waveforms and each waveform further having a respective predetermined position within the wavetrain;

sensing the predetermined environment for a second wave of energy, wherein the second wave may include a portion of the first wave;

for each waveform:
correlating the second wave with a replica of the first wave for forming a correlation signal; and
delaying the correlation signal for forming a delayed correlation signal, wherein the amount of delay is indicative of the relative position of the waveform in the wavetrain;

combining the delayed correlation signals for each waveform to form a master correlation signal; and declaring the presence of the object when the master correlation signal exceeds a predetermined threshold, wherein the master correlation signal is independent of relative radial velocity between the object and the sensor of energy for sensing the environment.

15. The method as in claim 14, wherein the Doppler insensitive waveforms include hyperbolas having the same predetermined assymptotes.

16. The method as in claim 14, wherein the step of transmitting includes transmitting the first wave during a predetermined first interval, the wavetrain beginning and ending at the beginning and ending of the first interval, respectively, and each waveform for modulating one of a plurality of sub-intervals of the first interval, wherein the beginning and ending of the waveform coincides with the beginning and ending, respectively, of a corresponding sub-interval of the first interval and yet further wherein the step of delaying includes delaying the correlation signal an amount responsive to the duration of the wavetrain less the duration of a second interval, the second interval measured from the ending of the corresponding waveform to the ending of the wavetrain.

17. The method as in claim 16, wherein the sub-intervals of the first interval are contiguous.

18. The method as in claim 14, wherein the first wave further includes a series of spaced apart pulses of energy and the method further includes the step of modulating the spaced apart energy pulses with a corresponding one of the frequency waveforms.

* * * * *